US011699109B2

(12) United States Patent
White et al.

(10) Patent No.: US 11,699,109 B2
(45) Date of Patent: *Jul. 11, 2023

(54) ARTIFICIAL INTELLIGENCE AND/OR MACHINE LEARNING MODELS TRAINED TO PREDICT USER ACTIONS BASED ON AN EMBEDDING OF NETWORK LOCATIONS

(71) Applicant: Dstillery, Inc., New York, NY (US)

(72) Inventors: Amelia Grieve White, Old Greenwich, CT (US); Melinda Han Williams, Brooklyn, NY (US); Christopher Allen Jenness, Brooklyn, NY (US); Jason Jerard Kaufman, White Plains, NY (US); Evan Bard Hills, Brooklyn, NY (US); Mark Alan Jung, Lewisville, TX (US)

(73) Assignee: Dstillery, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/732,249

(22) Filed: Apr. 28, 2022

(65) Prior Publication Data
US 2022/0261674 A1 Aug. 18, 2022

Related U.S. Application Data

(60) Division of application No. 17/569,412, filed on Jan. 5, 2022, which is a continuation of application No. (Continued)

(51) Int. Cl.
*G06Q 30/0201* (2023.01)
*G06Q 30/0251* (2023.01)
(Continued)

(52) U.S. Cl.
CPC ........... *G06N 20/20* (2019.01); *G06F 16/955* (2019.01); *G06F 16/958* (2019.01);
(Continued)

(58) Field of Classification Search
CPC ....................... G06Q 30/0255; G06Q 30/0201
See application file for complete search history.

(56) References Cited

U.S. PATENT DOCUMENTS

| | | | |
|---|---|---|---|
| 8,655,695 B1 * | 2/2014 | Qu ..................... | G06Q 30/0251 705/7.29 |
| 10,417,653 B2 * | 9/2019 | Milton ............... | G06Q 30/0201 |

(Continued)

OTHER PUBLICATIONS

Non-Final Office Action dated Feb. 17, 2021, for U.S. Appl. No. 17/108,770, filed Dec. 1, 2020, 36 pages.
(Continued)

*Primary Examiner* — Azam A Ansari
(74) *Attorney, Agent, or Firm* — Cooley LLP

(57) ABSTRACT

A computer-implemented method can facilitate delivery of targeted content to user devices in situations in which historic tracking data (e.g., cookie data) is generally unavailable and/or unreliable. A p-dimensional embedding of websites can be generated based on a group of user devices for whom tracking data is available. Conversion event data that indicates indicating whether that audience member performed a conversion action can be received. A machine learning model can be trained using the conversion event data and the positions of websites appearing in the conversion event data within the p-dimensional embedding to predict a likelihood of conversion and/or a type of content to provide given a position in the p-dimensional embedding. When an indication that a user device is accessing a website is received, a position of that website in the p-dimensional embedding can be determined and targeted content can be delivered to the user device.

21 Claims, 8 Drawing Sheets

Related U.S. Application Data

17/379,570, filed on Jul. 19, 2021, which is a continuation of application No. 17/108,770, filed on Dec. 1, 2020, now Pat. No. 11,068,935, which is a continuation-in-part of application No. 16/586,502, filed on Sep. 27, 2019.

(60) Provisional application No. 62/737,620, filed on Sep. 27, 2018.

(51) Int. Cl.
*G06N 20/20* (2019.01)
*G06F 16/958* (2019.01)
*G06F 16/955* (2019.01)
*G06N 20/00* (2019.01)
*G06F 18/231* (2023.01)
*G06N 7/01* (2023.01)

(52) U.S. Cl.
CPC .............. *G06F 18/231* (2023.01); *G06N 7/01* (2023.01); *G06N 20/00* (2019.01); *G06Q 30/0201* (2013.01); *G06Q 30/0254* (2013.01); *G06Q 30/0255* (2013.01)

(56) References Cited

U.S. PATENT DOCUMENTS

| | | | | |
|---|---|---|---|---|
| 10,878,480 | B2* | 12/2020 | Hueter | H04L 51/212 |
| 10,902,009 | B1 | 1/2021 | Lenz, Jr. et al. | |
| 11,068,935 | B1 | 7/2021 | White et al. | |
| 2010/0138437 | A1* | 6/2010 | Nadig | G06F 16/958 |
| | | | | 707/E17.108 |
| 2010/0198772 | A1* | 8/2010 | Silverman | G06Q 30/02 |
| | | | | 706/54 |
| 2011/0258049 | A1* | 10/2011 | Ramer | G06Q 30/0273 |
| | | | | 705/14.69 |
| 2012/0084349 | A1 | 4/2012 | Lee et al. | |
| 2014/0297394 | A1* | 10/2014 | Li | G06T 1/0064 |
| | | | | 705/14.55 |
| 2015/0081734 | A1 | 3/2015 | Mason | |
| 2017/0236167 | A1 | 8/2017 | Bindra et al. | |
| 2017/0300966 | A1* | 10/2017 | Dereszynski | G06F 9/45504 |
| 2018/0246873 | A1 | 8/2018 | Latapie et al. | |
| 2018/0314704 | A1 | 11/2018 | Bull et al. | |
| 2018/0357531 | A1 | 12/2018 | Giridhari et al. | |
| 2019/0124381 | A1 | 4/2019 | Sheppard et al. | |
| 2019/0296844 | A1 | 9/2019 | Corder et al. | |
| 2019/0332617 | A1 | 10/2019 | Weston et al. | |
| 2020/0104738 | A1 | 4/2020 | Williams et al. | |
| 2020/0195779 | A1 | 6/2020 | Weisman et al. | |
| 2021/0319035 | A1 | 10/2021 | Lenz, Jr. et al. | |
| 2022/0012614 | A1 | 1/2022 | White et al. | |
| 2022/0129777 | A1 | 4/2022 | White et al. | |

OTHER PUBLICATIONS

Raeder, T. et al., Scalable Supervised Dimensionality Reduction Using Clustering, Proceedings of the 19th ACM SIGKDD International Conference on Knowledge Discovery and Data Mining (2013).

Final Office Action for U.S. Appl. No. 17/569,412, dated Sep. 9, 2022, 48 pages.

Non Final Office Action for U.S. Appl. No. 17/569,412, dated May 24, 2022, 44 pages.

Non-Final Office Action for U.S. Appl. No. 16/586,502, dated Apr. 1, 2022, 8 pages.

Notice of Allowance for U.S. Appl. No. 17/108,770, dated Jun. 10, 2021, 16 pages.

Notice of Allowance for U.S. Appl. No. 16/937,223, dated Sep. 17, 2020, 11 pages.

* cited by examiner

ARTIFICIAL INTELLIGENCE AND/OR MACHINE LEARNING MODELS TRAINED TO PREDICT USER ACTIONS BASED ON AN EMBEDDING OF NETWORK LOCATIONS

CROSS REFERENCE TO RELATED APPLICATIONS

This application is a divisional of U.S. patent application Ser. No. 17/569,412, filed Jan. 5, 2022, which is a continuation of U.S. patent application Ser. No. 17/379,570, filed Jul. 19, 2021, which is a continuation of U.S. patent application Ser. No. 17/108,770, filed Dec. 1, 2020, now U.S. Pat. No. 11,068,935, which is a continuation-in-part of U.S. patent application Ser. No. 16/586,502, filed Sep. 27, 2019, which is a non-provisional of and claims priority to provisional U.S. Patent Application No. 62/737,620, filed Sep. 27, 2018, the disclosure of each of which is hereby incorporated by reference in its entirety.

FIELD

Some embodiments described herein relate to the generation and/or use of embedding of websites. Representation of websites in an embedding space can represent relationships between websites. Machine learning models can be trained to predict user actions based, at least in part, on the position of a network location in the embedding space.

BACKGROUND

Some embodiments described herein relate to unsupervised machine learning techniques that enable improvements in identifying target audiences and techniques for reducing the sparseness of data sets to enable otherwise unfeasible, unsupervised machine learning.

Typically, brands have employed market research firms to conduct surveys and/or focus groups to better understand their customers. Known forms of market research, however, can take months to complete and cost millions of dollars. Moreover, survey question selection can have a large impact on the results of a market research survey. A market research firm may be unable to formulate questions that would identify or characterize an audience the market research firm does not know the brand has. For example, if a brand is primarily focused on stay-at-home moms, a market research survey may be unable to identify that the brand also has a significant following among outdoorsmen and/or may be unable to develop insights into what outdoorsmen's interests in the brand might be. Similarly, focus group-based market research can also be biased (unintentionally or otherwise) because it may be difficult or impossible to identify a representative set of subjects that accurately portrays a company's overall and/or target customer set. Known forms of market research are also limited by relying on self-reported behavioral data, which relies on the subjects' honesty, memory, and introspective abilities.

New techniques for characterizing audiences and selecting targets for the delivery of targeted content have arisen in the internet age, and targeted content delivery has become a fundamental feature of the modern internet. Targeted content delivery can be roughly divided into two distinct modes, retargeting and prospecting. Retargeting involves providing targeted content to people who have previously taken a predefined action, while prospecting involves predicting which people are likely to be interested in targeted content. For example, during a retargeting campaign, individuals who have previously visited particular predefined webpages, purchased certain predefined items, and/or have social media connections with predefined profiles, may be selected to receive targeted content. Retargeting can include sending brand-related content to individuals who have previously interacted with the brand. Prospecting, by contrast, seeks to identify individuals who may be interested in the targeted content who have not been observed taking any particular predefined action. Prospecting generally involves the analysis of a relatively large amount of data associated with the user.

Modern prospecting is typically a "big data" operation, in which sophisticated algorithms process large amounts of information with the goal of quickly grouping or classifying individuals based on their predicted affinity to a content item. Known techniques, however, suffer from a number of drawbacks. For example, some known supervised learning techniques seek to predict how likely an individual is to perform a particular action (e.g., buy a product, click an advertisement, etc.). Before a supervised learning technique can be applied, a model must be trained using data that includes a measure of the action sought to be predicted. Selecting the action to be predicted, however, can be a significant challenge and/or data revealing the occurrence of the predicted action may be unavailable. For example, a brand selling sports equipment may be interested to know that it has a significant following among parents, and to identify those customers of its products that are parents to target them or to learn more about them. A supervised algorithm would not be able to identify this group of users from the full customer base unless (a) the brand already knew there was a group of parents in its customer base and (b) there were available examples of which users were parents. Without a very specific data source that labels this exact set of people, supervised learning techniques would be unable to identify that the brand has a significant following among parents, much less identify specific individuals as parents. Moreover, due to deficiencies of supervised learning techniques, the brand would generally be unable to identify suitable audiences if the suitable audience is not identified in the data revealing the occurrence of the predicted action. Similarly stated, even if the brand selling sports equipment were able to identify parents, many other subpopulations exist for which traditional market research data is not coded, particularly characteristics the brand has not previously identified as relevant.

Additionally, traditionally individual users have been classified using an identifier shared by the user's device, such as a cookie identifier, identifier for advertising, or other suitable indicator that can be received by websites and/or advertisers when that individual visits a particular website. Such identifiers have traditionally allowed content providers to track individuals across domains and characterize individuals based on a browsing history. Recently, however, there has been a renewed effort by browser developers to enable private browsing technologies that prevent content providers from identifying individuals. Instead, in some instances, browser developers may provide identifiers that identify a group of users and/or provide aggregated browsing information for the group of users. Accordingly, a need exists for systems and methods to select and deliver targeted content in an environment where some or all individuals are untrackable.

DETAILED DESCRIPTION

Figure 1:
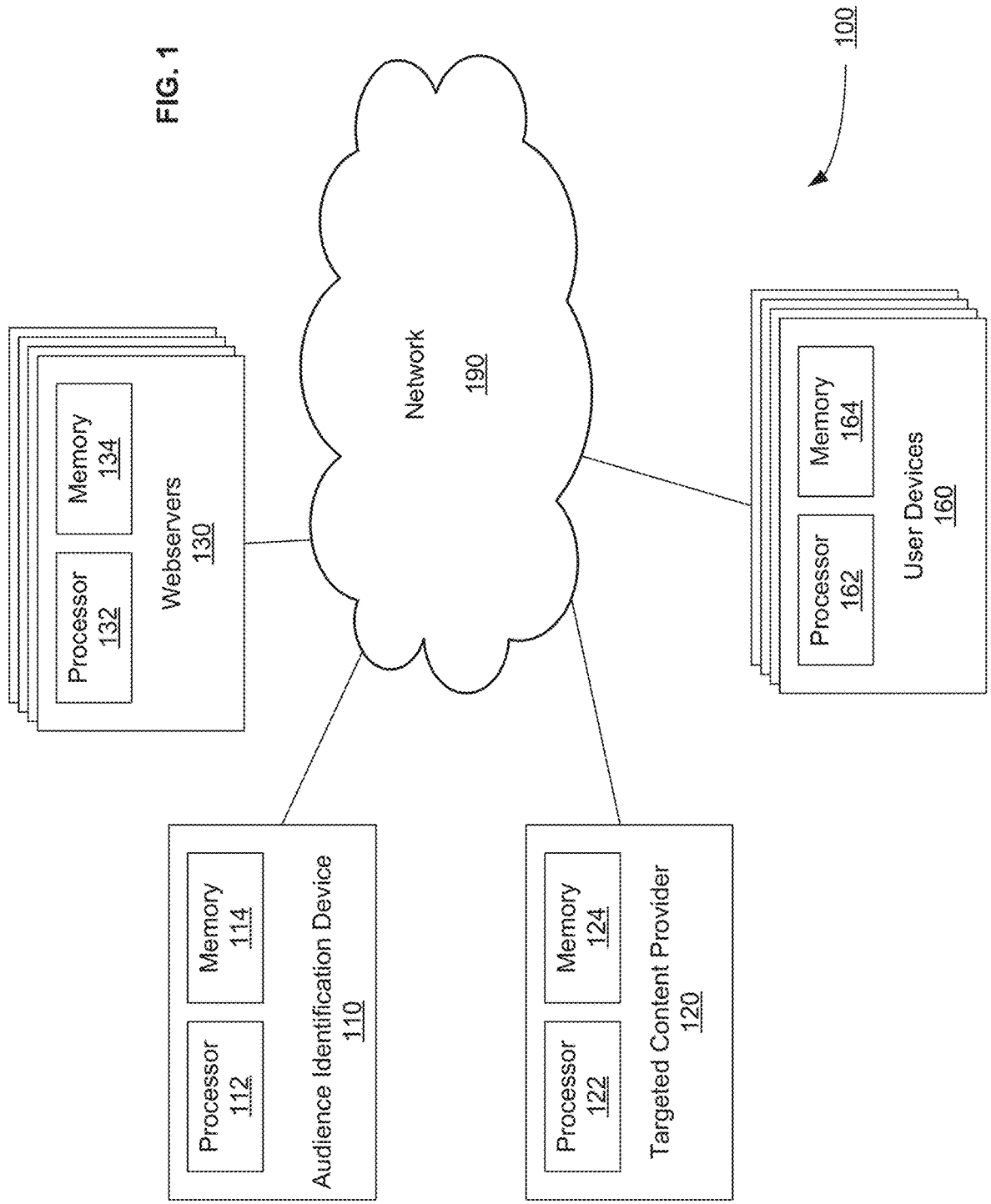
FIG. 1 is a schematic illustration of a system that includes an audience identification device, according to an embodiment.

Some embodiments described herein relate to a computer-implemented method that includes accessing behavioral data, such as web visitation data, of multiple users. A sparse behavioral vector can be defined for each user based on the behavioral data. Each element of each sparse behavioral vector can represent a different potential detectable behavior such that each sparse behavioral vector encodes the behavioral data for that user. Multiple supervised learning models can be applied to each sparse behavioral vector to densify the vectors, defining multiple dense behavioral vectors. An unsupervised machine learning technique can be applied to the dense behavioral vectors to cluster, or define subpopulations, based on similarities between the dense behavioral vectors. Delivery of targeted content to a user can be facilitated based on a dense behavioral vector associated with that user being associated with one or more of the clusters or subpopulations.

Some embodiments described herein relate to a computer-implemented method that includes accessing sparse behavioral vectors. Each sparse behavioral vector can be associated with a user. Each element of each sparse behavioral vector represents a different detectable behavior. Multiple supervised machine learning models can be applied to each sparse behavioral vector. Each supervised learning model can be uniquely associated with a potential detectable behavior and configured to produce a score representing a probability that a user will perform that potential detectable behavior. The scores produced by the supervised machine learning can be used to define dense behavioral vectors; each element of each dense behavioral vector can correspond to a score produced by a different supervised machine learning model applied to the corresponding sparse behavioral vector. An unsupervised machine learning technique can be applied to the dense behavioral vectors to cluster, or define subpopulations, of dense behavioral vectors based on similarities between them. Delivery of targeted content to a user can be facilitated based on a dense behavioral vector associated with that user being associated with one or more of the clusters or subpopulations.

Some embodiments described herein relate to a computer-implemented method that includes receiving website visitation data. A machine learning technique can be applied to define associations between a plurality of websites represented in the website visitation data. An embedding of the plurality of websites in p-dimensional space can be defined based on the associations between the plurality of websites. A plurality of clusters of websites can be identified based on proximity of websites from the plurality of websites to each other in the p-dimensional space. A position of a user in the p-dimensional space can be identified based on website visitation data for the user. Delivery of targeted content to the user can be facilitated based on the user's position to relative to a cluster of websites. For example, targeted content can be selected based on the cluster nearest to the user in the p-dimensional space.

Some embodiments described herein relates to a computer-implemented method that includes accessing website visitation records for a first group of user devices. A p-dimensional embedding of websites can be generated based on the website visitation records for the first group of user devices. Conversion event data associated with website visitations records for a second group of user devices can be accessed. A position of each user device from the second group of user devices in the p-dimensional embedding can be determined based on the website visitation data for the second group user devices. Using the conversion event data and the website visitation records for the second group of user devices, a machine learning model can be trained to predict whether a user device is likely to take a conversion action, such as purchasing a good or service based on the position of that user device in the p-dimensional embedding. An indication that a user device is accessing a website can be received (the user device may not be from the first group of user devices or the second group of user devices). A position of that user device in the p-dimensional embedding can be determined based on, for example, that user device's full website visitation history (e.g., cookie data associated with that user device), a portion of that user device's visitation data, or based solely on the indication that that user device is accessing a particular website. Delivery of targeted content to that user device can be facilitated based on predicting whether that user device is likely to take a conversion action based on the position of that user device in the p-dimensional embedding.

In some embodiments, a method includes receiving multiple website traffic data records, the multiple website traffic data records is associated with multiple user devices. The method further includes generating a website traffic embedding based on the multiple website traffic data records. The method further includes defining training data including the website traffic embedding and website traffic data records for at least one of the multiple user devices and multiple conversion event data associated with at least one of the multiple user devices. The training data can be used to train a machine learning model. An indication of advertisement display opportunity can be provided to the machine learning model based on a user device that is not from the multiple user devices accessing a webpage. The machine learning model can predict whether that user device is likely to undertake a conversion action.

Some embodiments described herein relate to a computer-implemented method suitable for facilitating delivery of targeted content to user devices in situations in which historic tracking data (e.g., cookie data) is generally unavailable and/or unreliable. A p-dimensional embedding of websites can be generated based on a group of user devices for whom tracking data is available. The group of user devices can opt-in and/or be compensated to be tracked and, in some instances can be a relatively small group of user devices. Conversion event data can be received. Conversion event data may be data contains historical website visitation records and conversion records for user devices. In other instances, conversion event data may be data relating to targeted content delivery and associated conversion events. For example, targeted content can be provided to websites and the conversion rates on that targeted content can be monitored. In some instances a variety of targeted content can be provided to websites (e.g., each website can receive multiple items of differing targeted content and/or different websites can receive different items of targeted content). In this way, the effectiveness of different types of targeted content on each website and/or on different websites can be evaluated. The conversion event data can indicate that a group of users visited at least one website, where at least a subset of the group of users were exposed to an item of targeted content, and at least a sub-subset of the subset of the group of users performed a conversion action after being exposed to the item of targeted content. The conversion event data can provide conversion information on a per-user and/or an aggregated basis. Similarly stated, in some instances, the conversion event data can indicate that individual user(s) (1) visited a website, (2) were exposed to an item of targeted content, and (3) performed a conversion action. In other instances, the conversion event data can be aggregated across users and indicate, for example, that a set of X devices visited website Y, were exposed to targeted content, and Z % performed a conversion action without including individual visitation, exposures and/or conversion information. In yet other instances, conversion event data can be aggregated across websites indicating, for example, that a set of X devices visited one of a set of websites Y1, Y2, Y3, etc., where they were exposed to the item of targeted content, and that Z % of those X devices performed a conversion action. In yet other instances, conversion event data can be aggregated by other attributes, such as time of day or device location. A machine learning model can be trained using the conversion event data and the positions of websites appearing in the conversion event data within the p-dimensional embedding to predict a likelihood of conversion and/or a type of content to provide given a position in the p-dimensional embedding. When an indication that a user device (e.g., an untrackable user device) is accessing a website is received, a position of that website in the p-dimensional embedding can be determined and targeted content can be delivered to the user device based on predicting, using the machine learning model, a likelihood that the user device will perform a conversion action based on the position of the website in the p-dimensional embedding.

Some embodiments described herein relate to unsupervised learning techniques, and in some more specific embodiments, clustering, and/or agglomerative hierarchical clustering. Unlike supervised learning, such techniques do not require training data that includes a measure of a desired outcome. Some embodiments described herein apply unsupervised learning techniques to user web visitation data. Web visitation data is a sparse, high-dimensional data set. In this sparse, high-dimensional space, no natural way exists to define a meaningful distance between any two users. For example, two users with no website history in common will have a similarity of zero. Because the space is so sparse, many pairwise similarities are zero, which means clustering in this space is impractical or gives results with limited usefulness. Some embodiments described herein relate to specific novel computational techniques for reducing the dimensionality and sparseness of sparse data sets, such as web visitation data, which can allow computers to apply unsupervised modeling techniques to large, sparse data sets that have been densified.

Raeder, T. et al., *Scalable Supervised Dimensionality Reduction Using Clustering*, Proceedings of the 19th ACM SIGKDD International Conference on Knowledge Discovery and Data Mining (2013) ("Raeder"), the disclosure of which is hereby incorporated by reference in its entirety, describes a technique related to those described in the present application. Techniques described in Raeder involve reducing dimensionality by performing clustering on websites (or representations of websites) themselves, so that fewer dimensions can be used to represent the space of all websites. The technique described in Raeder, however, does not address the sparseness problem or reduce the dimensionality of users (or representations of users). Rather, Raeder collapses the existing non-zero dimensions that represent attributes of websites into fewer non-zero dimensions, but does not introduce new non-zero dimensions to describe each website. The resulting space generated by applying techniques described in Reader may have lower-dimensionality, but still very sparse, so that pairwise similarities between users, described by their history of website visitations, are zero for many users. Second, because Raeder's solution reduces dimensionality by representing many different websites with the same feature, information about the differences between those websites is lost, so that two users who have different histories among those websites have the same representation in the low-dimensionality space and thus have a pairwise distance of zero. To meaningfully group together users with different characteristics with useful options for the number and size of clusters, a need remains for a technique that captures a range of meaningful pairwise distances between users.

FIG. 1 is a schematic illustration of a system 100, according to an embodiment. The system 100 includes an audience identification device 110, a targeted content provider 120, one or more webservers 130, and one or more user devices 160, each communicatively coupled via a network 190. The network 190 can be the internet, an intranet, a local area network (LAN), a wide area network (WAN), a virtual network, a telecommunications network, any other suitable communication system and/or combination of such networks. The network 190 can be implemented as a wired and/or wireless network.

The user devices 160 are computing entities, such as personal computers, laptops, tablets, smartphones, or the like, each having a processor 162 and a memory 164. The processor 162 can be, for example, a general purpose processor, a Field Programmable Gate Array (FPGA), an Application Specific Integrated Circuit (ASIC), a Digital Signal Processor (DSP), and/or the like. The processor 162 can be configured to retrieve data from and/or write data to memory, e.g., the memory 164, which can be, for example, random access memory (RAM), memory buffers, hard drives, databases, erasable programmable read only memory (EPROMs), electrically erasable programmable read only memory (EEPROMs), read only memory (ROM), flash memory, hard disks, floppy disks, cloud storage, and/or so forth. Each user device 160 can be operable to access one or more of the webservers 130. For example, a user operating a user device 160 to browse the internet (e.g., the network 190) can access webpages stored on one or more of the webservers 130. The webservers 130 can be computing entities each having a processor 132 and a memory 134, which can be structurally and/or functionally similar to the processors 162 and/or 164, respectively, discussed above.

The targeted content provider 120 can be a computing entity operable to select, deliver, and/or facilitate the delivery of one or more items of targeted content. For example, the targeted content provider 120 can be associated with an advertiser or advertising network that provides targeted content that is displayed by a user device 160 when that user device 160 accesses a particular webserver 130. Similarly stated, targeted content selected, delivered, or facilitated by the targeted content provider 120 can include advertisements embedded within, displayed with, or otherwise associated with webpages displayed by a user device 160. The targeted content provider 120 includes a processor 122 and a memory 124, which can be structurally and/or functionally similar to the processor 162 and/or memory 164, respectively, discussed above.

The audience identification device 110 can be a computing entity configured to receive signals indicative of actions or behaviors of users associated with some or all of user devices 160. For example, the audience identification device 110 can receive web visitation data for user devices 160 and/or webservers 130 using cookie-based or any other suitable technique for network traffic attribution (e.g., any suitable technique for identifying that a user device was used to access a webserver including, for example monitoring Internet Protocol (IP) addresses of user devices 160, user agents of user devices 160 and/or browser fingerprints, time of day, location, etc.).

In some instances, some or all user devices 160, may be configured not to send signals indicative of behaviors of users associated with such user devices 160, and/or may be configured not to send identifiers of any kind (e.g., cookie identifier, IP address, etc.). Similarly stated, browsers or other hardware and/or software associated with some or all user device 160 may prevent data associated with cookies or other unique identifying information from being send to the audience identification device 110. In some such instances, a non-unique identifier—an identifier shared by a sufficiently large number of users (hundreds, thousands, tens of thousands, etc.)—can be sent to the audience identification device 110. The non-unique identifier can be associated with aggregate, summarized, and/or otherwise anonymized behavioral data for the group of users associated with that non-unique identifier. Additionally, in some instances, information indicative of user behavior (e.g. website visitation records) can be received directly from a subset of the user devices 160 and/or a separate group of users (e.g., a group of users who have opted in to having their activity tracked) or indirectly (e.g., from a privacy sensitive aggregator and/or anonymizing service).

In addition or alternatively, any other suitable signal, such as a signal representing behavioral data can be received by the audience identification device 110 and associated with a user of one or more of the user devices 160. For example, the audience identification device 110 can receive conversion event data. Conversion event data can include, for example, purchase information from purchase confirmation websites, purchase history associated with a user account, a credit reporting bureau, customer loyalty program, survey information, or any other suitable source. Conversion event data can also include information regarding whether a user took any suitable brand action, such as clicking on a predefined advertisement or like, visiting a predefined website, physically visiting a retail location, or any other suitable action. Conversion event data can include information not relating to any particular brand, such as visiting one of a set of predefined websites indicating interest in a product category, activity, or other interest. Conversion event data can identify users who undertook conversion actions or can be anonymized and/or aggregated. For example, targeted content can be served to a group of user devices, for example without knowing or receiving any information about the user devices other than that they visited a website hosting the targeted content, and conversion information for that group of users (e.g., an aggregate click-through rate) can be determined and/or received. The audience identification device 110 includes a processor 112 and a memory 114, which can be structurally and/or functionally similar to the processor 162 and/or the memory 164, respectively, discussed above.

As discussed in further detail herein, the audience identification device 110 can be operable to apply machine learning techniques to identify subsets of the user devices 160 or users associated with one or more user devices 160 (also referred to herein as subpopulations) based on the web visitation or other behavioral data. In some embodiments, subpopulations are identified based on a predicted affinity towards the targeted content, and not based on users within the subpopulation having taken one or more predefined actions. Similarly stated, the audience identification device 110 can be suitable to perform prospecting.

Machine learning techniques performed by the audience identification device 110 can be used to identify one or more subpopulations. The audience identification device 110 can be operable to send a signal to the targeted content provider 120 and/or other suitable party or device that includes a representation of the one or more subpopulations. The subpopulations can be studied to identify particular subpopulations that the targeted content provider 120 desires to reach or study. Unless specified otherwise, references to unsupervised machine learning and/or clustering refer specifically to hierarchical clustering. It should be understood, however, that techniques described in the context of clustering may be applicable to other suitable machine learning techniques, such as k-means clustering, and/or unsupervised co-clustering. Similarly stated, the audience identification device 110 can be operable to break an audience into subpopulations. In some instances, the audience identification device 110 can further be operable to predict which subpopulations are receptive to and/or likely to convert an item of targeted content via any suitable unsupervised machine learning technique. In addition or alternatively, the audience identification device 110 can be operable to prepare and/or transmit analytics and/or other suitable reports that can aid a marketer or other suitable entity to understand a brand's audience, including identifying and reporting on the one or more subpopulations.

In some embodiments, the memory 114 can store a vector for each user device 160 and/or for each user associated with one or more user devices 160. Such a vector can represent that user device's/user's behavior in a format discussed in further detail below. Using techniques described in further detail below, the processor 112 can be operable to perform machine learning techniques on a matrix comprising vectors of an audience (set of users) to identify subpopulations. Subpopulations can further be clustered to identify sub-subpopulations. In some embodiments the number subpopulations within each taxonomic rank and/or the number of taxonomic ranks can be user-selectable.

A vector for a user/user device 160 can include a large number of elements. Each element can represent a different webserver 130, a different uniform resource locator (URL), or any other suitable indicator of a potentially detectable behavior. If a user/user device 160 has visited a URL/webserver 130 or otherwise engaged in a behavior associated with a particular vector element, the element for that behavior and/or URL/webserver 130 in that user's vector can be set to 1. Conversely, if a user/user device 160 has not visited a URL/webserver 130 or otherwise engaged in a behavior associated with a particular element, the element for that behavior and/or URL/webserver 130 in that user's vector can be a 0. Alternatively, non-binary schemes are also possible. For example, each element can be a representation of that user's engagement with a URL/webserver 130 (e.g., representing number of times visited, time spent, links clicked, etc.). Similarly stated, each vector can be a representation of a user's/user device's 160 web browsing history. Given the size of the internet (e.g., the network 190) and/or universe of possible tracked behaviors, such a vector would be large and sparse, with, on average, less than 0.1%, less than 0.01%, or less than 0.001% of entries having a non-zero value. The processor 112 can be operable to identify subpopulations, sub-subpopulations and so forth by performing clustering on a set of vectors (a matrix) representing an audience (e.g., the set of users/user devices 160).

Figure 2:
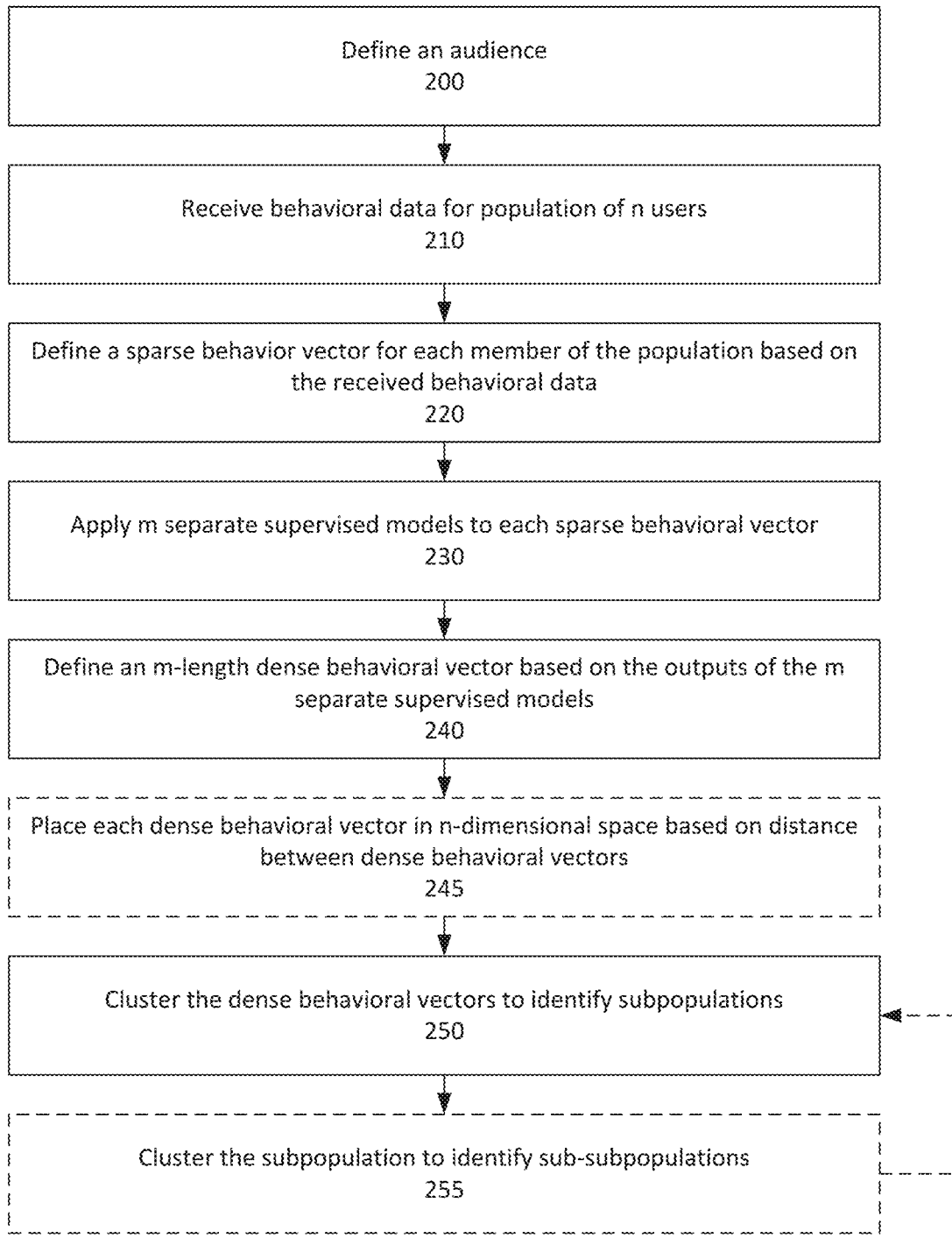
FIG. 2 is a flow chart of a method of identifying subpopulations of an audience, according to an embodiment.

FIG. 2 is a flow chart of a method of identifying subpopulations of an audience, according to an embodiment. At 200, the audience can be defined. The audience can be, for example, all users or a subset of users for whom behavioral data is available, visitors to a particular webpage(s) (e.g., webserver(s) and/or URL(s)), customers who bought a particular product(s) or services(s) (e.g., on the internet and/or as identified from a customer loyalty program), people who have visited a particular physical location, people who have expressed interest in a webpage as determined by a classification model, and/or any other suitable audience identified through any suitable means. At 210, behavioral data for members of the audience can be received. For example, behavioral data for a subset of users for whom behavioral data is available can be received. As discussed above with reference to FIG. 1, the behavioral data can be web history or any other suitable behavior data received at an audience identification device. Similarly stated, in some embodiments, the behavioral data can be based on direct and/or passive observation, not self-reported (e.g., survey) data. In other embodiments, behavioral data can be based on and/or include survey data.

At 220, a sparse behavior vector for each member of the population can be defined based on the behavioral data received at 210. The sparse behavior vector can include an element for each potential detectable behavior. For example, each element of the sparse behavior vector can represent a different website/URL, product available for purchase, and/or the like. Given the number of websites/URLS, products available for purchase, and other identifiable behaviors, the sparse behavioral vector can be tens of thousands, hundreds of thousands, millions, tens of millions, hundreds of millions, billions, or tens of billions of elements long. The vast majority (99.9%, 99.99%, 99.999% or more) of the sparse behavioral vector for each audience member can be zeros or otherwise indicate that the member of the audience (e.g., a user device and/or user associated with a user device) represented by that sparse behavioral vector has not been observed performing a behavior associated with that element. A small number of elements (e.g., 0.1%, 0.01%, 0.001% or fewer) for each audience member can be ones or otherwise indicate that the member of the audience represented by that sparse behavioral vector performed a behavior associated with that element. Many unsupervised learning techniques require a measure of similarity or distance between pairwise combinations of records. When the behavioral vectors are extremely sparse, most pairs of users have no overlapping dimensions with non-zero values. This leads to a situation where, depending on the choice of distance metric, many pairwise distances are either not meaningful, or take the maximum distance value (e.g., a similarity of zero), so this sparse representation does not contain enough information to achieve meaningful results using these unsupervised learning techniques.

At 230, m supervised learning models can be applied to each sparse behavioral vector defined at 220. Five hundred is an example of a suitable m, and, for ease of description, references herein to five hundred should be understood as referring to m. It should be understood, however, that m can be any other suitable integer greater than 1, such as 50, 100, 1000, or 5000. For example, a model for each of 500 websites or URLs represented by an element in the sparse behavioral vectors can be defined. Supervised models are used here because each of the 500 models can produce an output or score for each sparse behavioral vector. The score can represent, for example, a prediction of the likelihood of a user performing a potential detectable behavior (e.g., visiting a webpage, purchasing a good/service, etc.), an affinity of a user/user device associated with that sparse behavioral with the selected website or URL, a prediction or probability that a user/user device will make a purchase, and/or a prediction or probability that a user/user device will perform a conversion action. For example, the score can be an integer or floating point value in which higher values represent strong associations with the selected URL and/or products/services associated with the URL. For example, one of the 500 models can predict a likelihood that a user represented by a sparse behavioral vector will visit espn.com, while another of the 500 models predicts a likelihood of a user visiting bbc.co.uk, while another of the 500 models will predict the likelihood of a user visiting etsy.com. The 500 websites or URLs can be selected randomly or manually as representatives of categories of websites. Notably, the 500 websites or URLs may be selected independently of, be unrelated to, and/or be entirely different from the audience identified at 200. Similarly stated, the supervised learning models applied at 230 do not seek to identify, characterize, or segment the audience. For example, the audience identified at 200 might be users who have been observed visiting budwiser.com, while the 500 models may not include budwiser.com and/or may be selected independently of identifying the audience as visitors of budwiser.com, at 200. In this way, the 500 supervised learning models applied at 230 produce 500 partially, substantially, or completely independent measures of the sparse vector. Thus, in some instances, one or more of the 500 models may seek to predict an affinity of the audience for a website or other potential behavior that no audience members have been detected visiting/performing.

In some embodiments, the 500 models can be trained using a data set that is distinct from data representing the audience. In other embodiments at least portion of the data representing the audience can be used to train the 500 models, while another at least a portion of the data representing the audience can be used to validate the 500 models.

At 240, a dense behavioral vector can be defined based on the outputs of the 500 models. For example, a dense behavioral vector having a length of 500 can be defined for each sparse behavioral vector where each element of the dense behavioral vector is a score produced by one of the 500 models, placing each dense behavioral vector in an m-dimensional space. Optionally, at 245, a distance from each dense behavioral vector can be measured from each other dense behavioral vector using a suitable distance metric like cosine distance, correlation distance, or Euclidean distance, placing each dense behavioral vector in n-dimensional space, where n is the size of the audience (e.g., the number of dense behavioral vectors and users/user devices).

At 250, unsupervised machine learning techniques can be applied to the dense behavioral vectors, in m-dimensional space or optionally as they exist in the n-dimensional space, to define a number of subpopulations. As discussed above, the densification of sparse behavioral vectors into m-dimensional (or n-dimensional) space can facilitate unsupervised learning techniques that could not otherwise be applied to the sparse behavioral vectors. Such unsupervised learning techniques can provide insights not previously available via supervised techniques, such as the identification of unexpected subpopulations. Similarly stated, applying the techniques described herein allow a compute device to perform analyses that would previously been impossible.

In some embodiments, the number of subpopulations, k, the audience is clustered into can be a user-definable parameter. Similarly stated, an analyst associated with an audience identification device can specify the number of clusters (subpopulations) to be produced. Optionally, at 255, each subpopulation can be further clustered into lower ranked taxonomic orders using a similar unsupervised machine learning technique or any other suitable clustering technique. If the original unsupervised machine learning technique was a hierarchical method, a further clustering can be performed based on the original hierarchical results. The clustering process can be repeated any number of times to produce finer and finer-grained subpopulations. Each subpopulation and/or lower taxonomical ranks can be characterized by any suitable technique, including, for example, by characteristics based on web history, media usage, or other indications of subpopulation interests. Characterizing subpopulations can include, for example, the top website visited by that subpopulation, optionally normalized against generic internet traffic. Subpopulations and/or sub-subpopulations can be used to identify users for the delivery of targeted content.

Figure 3:
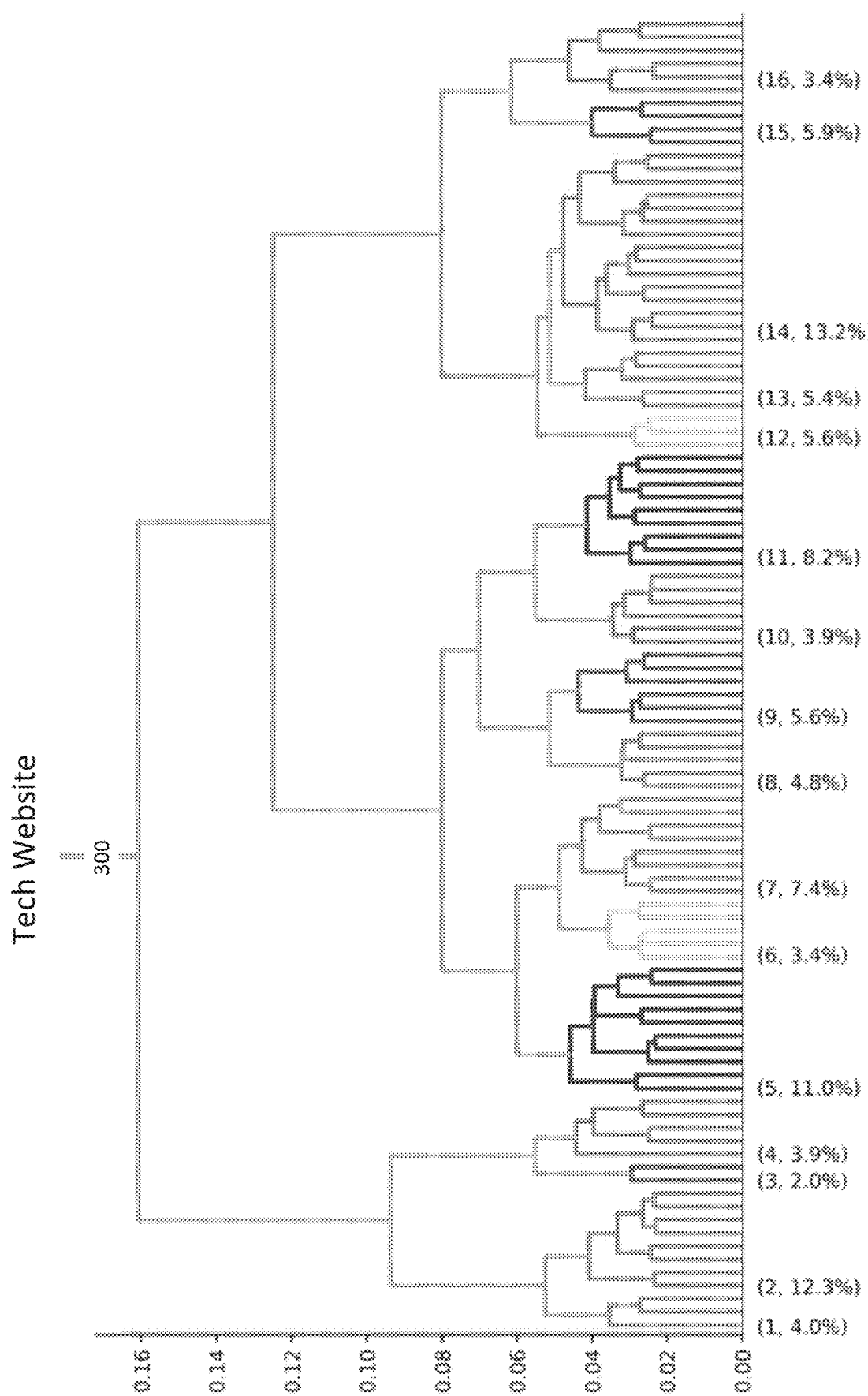
FIG. 3 is an example of a taxonomic map of an audience of a technology website, produced according to the method of FIG. 2.

FIG. 3 is an example of a taxonomic map of an audience of a technology website, produced according to the method of FIG. 2. Similarly stated, the taxonomic map depicted in FIG. 3 can be an output of clustering dense behavioral vectors at 250. FIG. 3 illustrates the audience 300 of the technology website. The audience 300 is subdivided into a sixteen subpopulations (numbered 1-16) according to the method described above. Higher taxonomical orders (i.e., combinations of related subpopulations) are further identified. Each of the subpopulations is further divided into between two (subpopulation 3) and fifteen (subpopulation 14) sub-subpopulations. Although not shown, each sub-subpopulation could be further divided into lower taxonomical orders. The y-axis of FIG. 3 represents the distance between two groups in m-dimensional space, as discussed above with reference to FIG. 2 and event 245.

Figure 4:
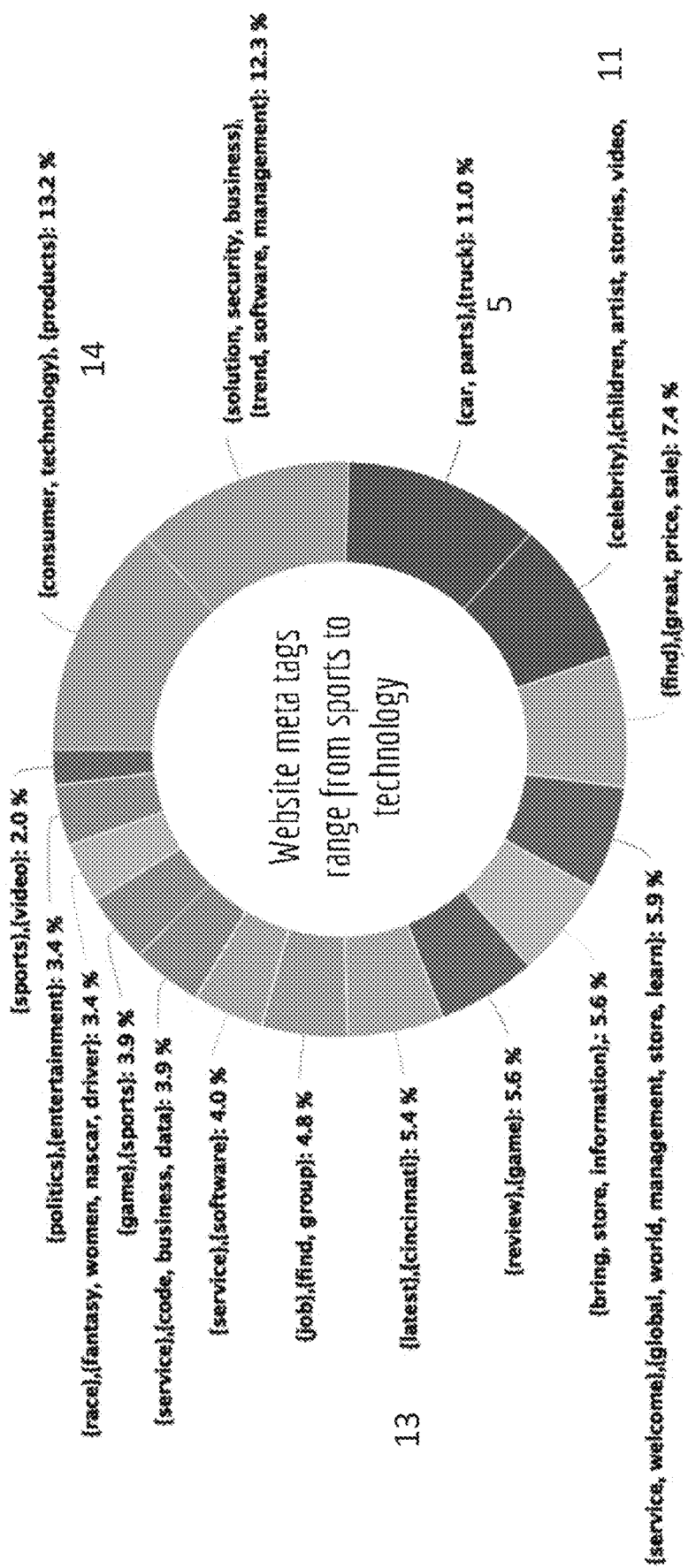
FIG. 4 is a pie chart showing the size of sub-subpopulations identified in FIG. 3.

FIG. 4 is a pie chart showing the size of subpopulations identified in FIG. 3. Because the machine learning technique applied to produce subpopulations, sub-subpopulations, and lower ranked taxonomic orders, at 250 and 255, is unsupervised, the output of the clustering technique does not depend on an analyst pre-identifying target groups or particular propensities. Rather, each subpopulation (and lower ranked taxonomical orders) are defined organically, which can be used to obtain new insights and new targetable audiences for a content provider interested in sending targeted content. Such insights could also be used by a brand manager, marketing strategist, or product designer. Similarly stated, the unsupervised nature of the technique used to identify the subpopulations does not involve an analyst specifying attributes, the identification of seeds or audience members around which a subpopulation is assembled, or otherwise pre-identifying features characteristic of a subpopulation prior to the application of the unsupervised machine learning technique. For example, although subpopulations having an interest in consumer technology 14 may be expected in an audience visiting a technology website, relatively large sub-subpopulations having interests in car parts and trucks 5, celebrities, children 11, and/or Cincinnati 13 may not be selected for analysis by supervised learning techniques. Similarly stated, were the audience of the technology website modeled using supervised learning techniques, the analyst responsible for training the model may not have the foresight to select training data suitable to detect sub-subpopulations with interest in car parts, trucks, celebrities, children, Cincinnati, and so forth. Identifying such hidden and/or unexpected niche audiences can allow for more precise targeting of content, planning of brand strategy, or design of future products or features. For example, a content provider interested in sending targeted content may select content prepared for the Cincinnati Convention & Visitors Bureau to accompany the technology website, where such content may reach a surprisingly large and/or receptive audience.

Figure 5:
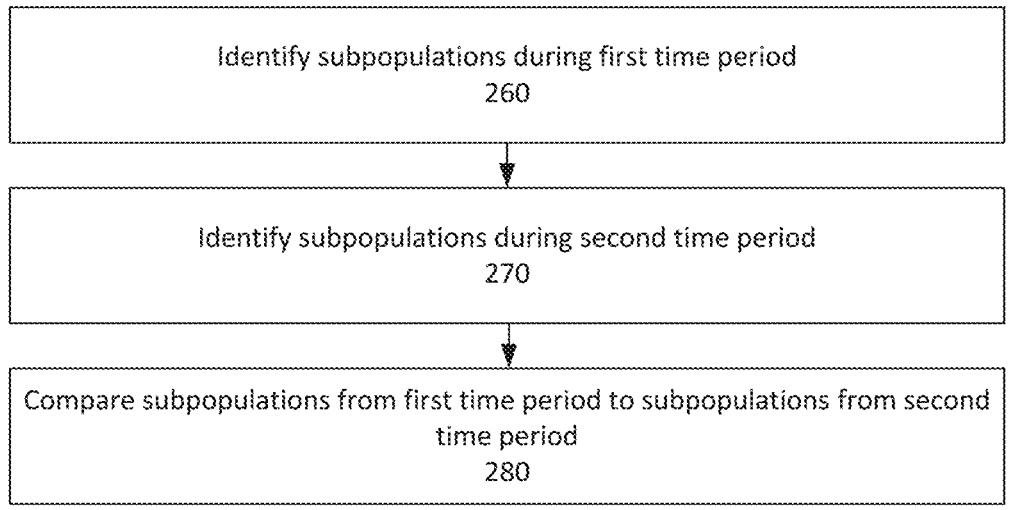
FIG. 5 is a flow chart of a method of tracking subpopulations (and/or lower ranked taxonomical orders), according to an embodiment.

FIG. 5 is a flow chart of a method of tracking subpopulations (and/or lower ranked taxonomical orders), according to an embodiment. At 260 and during a first time period, subpopulations of an audience can be identified. The subpopulations (and/or lower ranked taxonomical orders) can be identified via the method shown and described above with reference to FIG. 2. At 270 of FIG. 5, the method can be repeated for a second time period and/or a second audience. For example, the method described with reference to FIG. 2 can be performed for an audience of a website over a first time period, and then again for a second audience of the same website over a second time period. The first time period and the second time period may overlap or be mutually exclusive. As discussed in further detail below, at 280, the subpopulations identified during the first time period at 260 can be compared to the subpopulations identified during the second time period at 270. Changes in the size of one or more subpopulations, disappearance of one or more subpopulations, and/or new subpopulations can be identified, at 280. Tracking subpopulations according to the method depicted in FIG. 5 can be performed automatically and for any number of audiences. For example, the audience identification device described above with reference to FIG. 1 can be operable to track multiple audiences simultaneously (e.g., an audience for each of several websites) to identify subpopulations for each of several audiences (e.g., according to the method depicted in FIG. 2), and to identify changes in subpopulations. When a change of size of a subpopulation exceeds a threshold, when a new subpopulation emerges/is identified, and/or when a subpopulation disappears, the audience identification device can send an alert, for example to a content provider interested in sending targeted content, analyst, brand manager, and/or so forth which can in turn modify a strategy for the delivery of targeted content, marketing plan, or product development plan, etc. In some such embodiments, a targeted content provider or other entity identified in changes in subpopulations can send content to one or more subpopulations based on the identification of a new subpopulation. For example, a new subpopulation or growth of a subpopulation may represent a type of consumer with different interests than a previous type of consumer and/or an increasing importance of a new type of consumer, and the marketer may want to develop new messaging to reach this type of consumer. A decrease in size in a particularly valuable subpopulation (as measured by layering on some other data such as conversion rate or cart size) may indicate that the current marketing or targeting strategy is unsuccessful and should be changed. Although the subpopulations defined at 260 and 270 can be associated with any suitable time periods and/or differ by any suitable time, typically, the subpopulations defined at 260 and 270 represent audiences observed over a period of hours to months and differ by days to months.

At 280, a mapping between the subpopulations identified at 260 to the subpopulations defined at 270 can be defined. Because the clustering is unsupervised, there is no expectation that any particular subpopulation (e.g., subpopulation 1) identified at 260 is the same as a similar subpopulation identified at 270. Similarly, there is no pre-defined identification of which subpopulations are new or which subpopulations have disappeared. At 280, therefore, a mapping between subpopulations can be defined in one of several ways. For ease of description, the subpopulations identified at 260 will be referred to collectively as taxonomy A, and a subpopulations identified at 270 will be referred to collectively as taxonomy B.

According to one embodiment, a supervised multi-class classification (or model) can be trained on taxonomy A. This model predicts to which of the subpopulations in taxonomy A a user belongs. The model trained on taxonomy A can be applied to taxonomy B, such that each user in each subpopulation in taxonomy B has a label corresponding to a subpopulation in taxonomy A or a label that indicating no corresponding subpopulation in taxonomy A was identified. In this way, at 280, each subpopulation in taxonomy B can be mapped to a similar subpopulation in taxonomy A (or vice versa), or to introduce a new subpopulation(s) if there is no clear mapping to a subpopulation in taxonomy A. In some instances, a reverse mapping can identify users as belonging to corresponding subpopulations in taxonomy A and taxonomy B if a pre-defined level of agreement between a forward mapping and a reverse mapping is exceeded. Similarly stated, first taxonomy A can be mapped to taxonomy B, followed by reverse mapping taxonomy B to taxonomy A; a user can be identified as belonging to associated subpopulations in taxonomies A and B if the two mappings agree. This process can be extended for each user in taxonomy A and taxonomy B.

According to another embodiment, at 280, a sample of users from taxonomy A can be added to taxonomy B before performing the unsupervised learning on taxonomy B. In this way, each subpopulation in taxonomy B has a sample of users from taxonomy A that can be used to establish a mapping between taxonomies. If there are no members of a particular subpopulation in taxonomy A in a subpopulation in taxonomy B, or there is not sufficient agreement between subpopulations of users in taxonomy A and taxonomy B, then a new subpopulation can be defined in taxonomy B.

Figure 6:
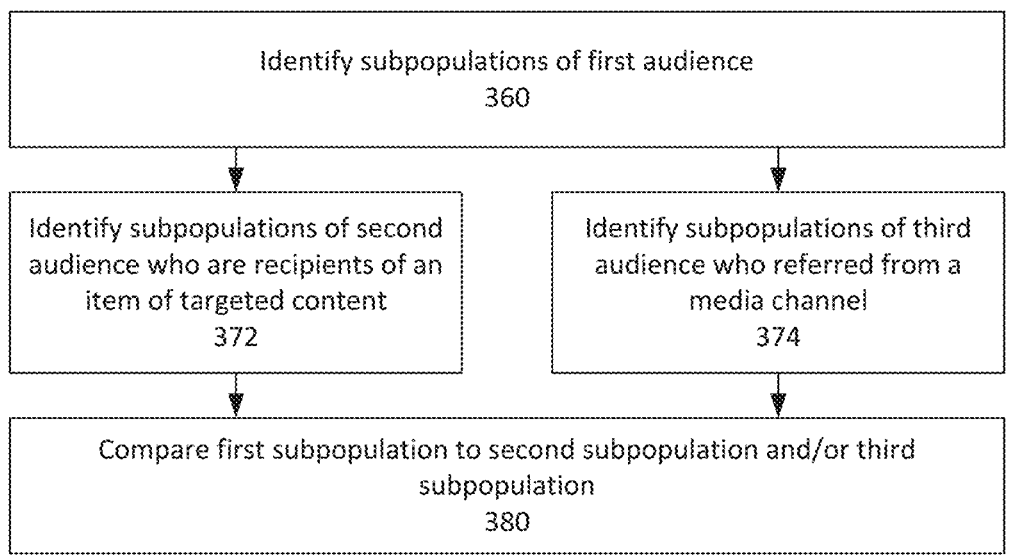
FIG. 6 is a flow chart of a method of tracking subpopulations, according to an embodiment.

FIG. 6 is a flow chart of a method of tracking subpopulations, according to an embodiment. At 360, subpopulations of a first audience can be identified. The first audience can be, for example, visitors to a webpage. The first subpopulations (and/or lower ranked taxonomical orders) can be identified via the method shown and described above with reference to FIG. 2. At 372, subpopulations of a second audience can be identified. The second audience can be a subset of the first audience. For example, the second audience can be users/user devices who became members of the first audience after receipt of an item of targeted content, such as an advertisement. At 374, subpopulations of a third audience can be identified. The third audience can be a subset of the first audience. For example, the third audience can be users/user devices who became members of the first audience based on a referral from another media channel, such as from a search result page, or a radio, billboard, or television advertisement. At 380, the subpopulations of the first audience can be compared the subpopulations of the second audience and/or the subpopulations of the third audience using techniques similar to those described above with reference comparing subpopulations at 280. The comparison, at 380, can allow the audience identification device and/or the targeted content provider to understand whether targeted content is effective, who targeted content reaches, and/or how the audience differs depending on how audience members reached the webpage. In some embodiments, the audience identification device, targeted content provider, or other entity can send targeted content or take any other suitable action based on the comparison at 380.

Figure 7:
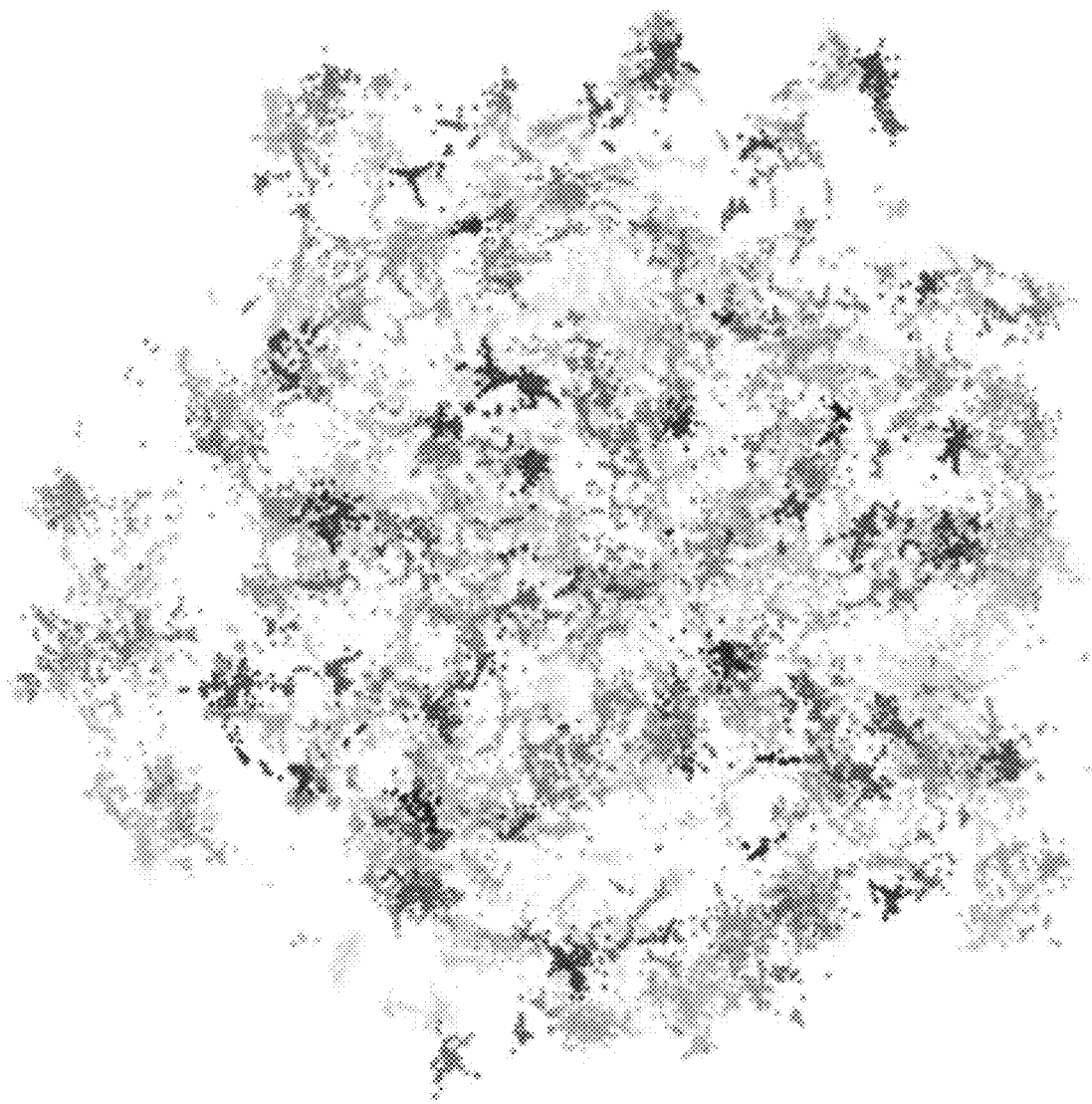
FIG. 7 is a visualization of the internet generated by a technique that includes embedding websites in a p-dimensional space, according to an embodiment.
Figure 8:
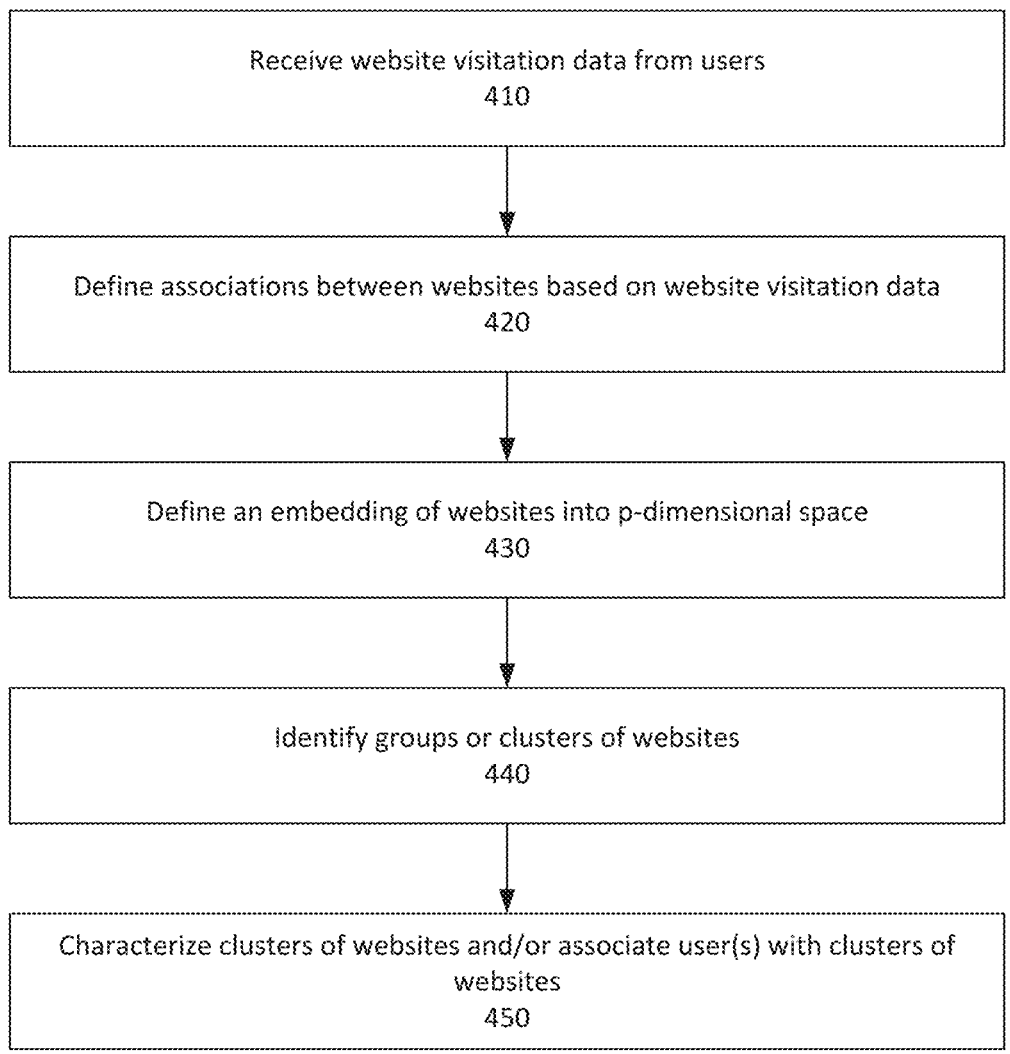
FIG. 8 is a flow chart of a method for clustering and/or mapping internet, according to an embodiment.

FIG. 7 is a visualization of the internet generated by a technique that includes embedding websites in a p-dimensional space, according to an embodiment. FIG. 8 is a flow chart of a method for clustering and/or mapping internet locations (also referred to as URLs or websites), according to an embodiment. Clustering and/or mapping websites according to methods described herein can serve to identify similarities between websites that are not otherwise discernable. For example, known methods of mapping the internet typically involve associating websites that link to each other or have common key words. Unlike known methods, embodiments described herein can identify similarities between websites based on actual patterns of user interaction with websites. As with techniques described above for identifying subpopulations of an audience, known techniques for mapping the internet are generally inadequate to identify groups of websites based on actual visitor behavior.

Meaningful distances between websites can be established by defining an embedding. An embedding is a relatively low-dimensional, learned continuous vector representation of a group of relatively high-dimensional vectors. Generating an embedding allows for the reduction of dimensionality while meaningfully representing the high-dimensional vectors in the embedding space.

A website embedding is a mapping from a website to a point in a p-dimensional vector space, where websites containing similar content are mapped to nearby points. At 410, website visitation data can be received from a number of users whose internet activity has been monitored (e.g., by cookie-based tracking or any other suitable technique). In some instances, website visitation from over 1,000,000, over 100,000,000, over 200,000,000 or over 500,000,000 users would be received. As discussed above, however, in other instances, cookie-based tracking may be unavailable for significant portions of users due to recent increases in private-browsing initiatives. Accordingly, in some instances the website visitation data received at 410 can be from a relatively small (hundreds to tens of thousands) number of users who have agreed to be tracked. Preferably the users whose internet activity has been monitored is a representative subset of the general internet browsing public. Weights and other suitable data processing techniques can be applied to behavioral data to compensate for demographic and/or behavioral deviations between the monitored users and the general internet browsing public. In some instances, the website visitation data for each user may include a list of all websites visited by that user and the order in which the websites were visited. In other instances, pairs of sequential website visitation events for a user can be stored for limited periods of time, optionally without any user identifiers, which can avoid the need to store full histories associated with specific users. At 420, a machine learning technique and/or neural network can be applied to the visitation data received at 410 and define associations between websites based on which sites are frequently viewed in sequence.

At 430, an embedding of the websites in p-dimensional space can be defined based on the associations between the websites, creating a p-dimensional map of the internet. 128 is an example of a suitable p, and, for ease of description, references herein to 128 should be understood as referring to p. It should be understood, however, that p can be any suitable integer greater than 1, such as 3, 4, 10, 50, 100, 200, or 500. FIG. 6 is a visualization of websites modeled into a 128-dimensional space and then projected into a 2-d space.

For example if multiple users are observed visiting www.netflix.com and www.hbo.com within a predetermined period of time and/or within a predetermined sequence (e.g., within 20 minutes, within an hour, without visiting any intervening websites, with fewer than five intervening websites, etc.), and similarly, multiple users (not necessarily the same users) are observed visiting www.tvtropes.com and www.hbo.com, then www.tvtropes.com and www.netflix.com can be mapped closer to each other in the 128-dimensional embedding. Moreover, two websites (target websites) viewed in the same context (where context is the sequence of websites visited before or after the target website) can be moved closer to each other based on the frequency of websites viewed in the same context as observed over the set of all users.

At 440, groups or clusters of websites can be identified. For example, websites located near each other in the 128-dimensional space (according to any suitable distance metric) can be identified as belonging to a cluster, using k-means or another suitable clustering technique. A cluster of websites may define an audience (users who have visited a minimum number of websites within the cluster). This audience may contain users that would be receptive to certain targeted content who would not otherwise have been identified, for it may not otherwise have been known that users who visit www.tvtropes.com are good candidates for advertisements about Netflix. Content and/or targeted advertising can be delivered to that audience.

Clusters of websites can be characterized and/or users can be associated with one or more clusters of websites, at 450. For example, a cluster of websites can be characterized by analyzing the website visitation data of users who visit websites within that cluster (e.g., users whose website visitation data indicates a minimum number of visits to websites in that cluster). Features of users who visit a particular cluster can be used to describe or classify that cluster. For example, if website visitation data of visitors to websites within a cluster characteristically overindexes a particular website (a particular website appears more frequently than it does in website visitation data of a random sample of users), that overindexing website can be used to characterize the cluster. Typically, the overindexing website will be within the cluster, but in some instances, a cluster can be characterized by an overindexing website that is not within the cluster or an overindexing cluster other than that cluster.

The website clusters may also be used to describe users or groups of users. For example, if one user has visited only www.tvtropes.com and another has visited only www.netflix.com, without clustering such websites together, it would not be obvious that those users share an actionable similar website visitation history. Grouping the websites into clusters provides a way to capture multiple actions under the same label and provides more descriptive power for understanding audiences and/or selecting audiences to receive targeted content.

In some embodiments, a position of users in the 128-dimensional space can be determined. For example, each website visited by a user can be (e.g., as ascertained by website visitation data associated by that user) can have a position in the 128-dimensional space. Each user's position can be an average, mean, median, max, or other suitable representative metric or summary of that user's web visitation history. In some instances, a user's positions in the 128-dimensional space (e.g., a vector having a length of 128) can be used as dense behavioral vectors and used to select and/or facilitate the delivery of suitable targeted content, cluster users, as described above at 245, 250, and/or 255, or otherwise analyze user behavior and/or make predictions about users' affinities. Similarly stated, determining a position of a user in the 128-dimensional space can be an alternative densification technique to the application of supervised models, as described above at 230 and/or 240. In other instances, a sparse behavioral vector can be densified based on the position of websites visited by an associated user in 128-dimensional without directly determining a position of that user in the 128-dimensional embedding. For example, a dense behavioral vector having a length of 256 can be defined by concatenating a mean position of websites visited by that user (a vector having a length of 128) and a max position of websites visited by that user (a vector having a length of 128).

The user's website visitation history within the 128-dimensional space can provide insights into the user's affinity for particular websites/website clusters even if that user has not been observed visiting those particular websites. For example, a user who has visited a website within a predetermined distance of a target website within the 128-dimensional map of the internet can be identified as an audience member or likely audience member of that target website, even if the user has not been observed visiting that target website. Content and/or advertisements for the user can be selected based on identifying the user as an audience member or likely audience member of a website.

The method described with reference to FIGS. 7 and 8 is particularly well suited to determine clusters of websites. It may be possible to use a technique similar to the method shown and described with reference to FIGS. 7 and 8 to clustering users. Because a user typically visits hundreds to thousands of websites, while each website may be visited by thousands to millions of users, however, the method of FIG. 7 will often provide a more meaningful embedding for websites than users. Similarly stated an embedding of websites defined by the method of FIG. 7 is likely to produce more actionable and/or measurable associations between websites than an embedding of users would produce actionable and/or measurable associations between users.

This mapping of websites can be used to inform the unsupervised clustering described in FIG. 2. In one embodiment, this mapping of websites can be used to select m targets for the m supervised models described in 230. Similarly stated, at 230, each of the m supervised models can be configured to predict a user's affinity for, likelihood of visiting, or other behavior associated with a cluster identified at 440. For example, k could be selected to be equal to the desired m, and one website from each of the k clusters could be selected, in order to guarantee that the m target URLs represent a variety of web behaviors.

In addition or alternatively, the 128-dimensional space mapping websites can be used as a dense, lower dimensional space to describe users, in order to define a distance metric between users that can be used to perform the unsupervised user clustering described above (e.g., at 250 as discussed with reference to FIG. 2) to product audience subpopulations. Users can be mapped into the 128-dimensional space based on their website visitation data. For example, an average location along each of the 128 dimensions can be calculated for a user based on that user's website visitation data, or a combination of the mean, median, minimum, maximum, and/or other properties along each of the 128 dimensions can be treated as a dense vector to describe the user.

Figure 9:
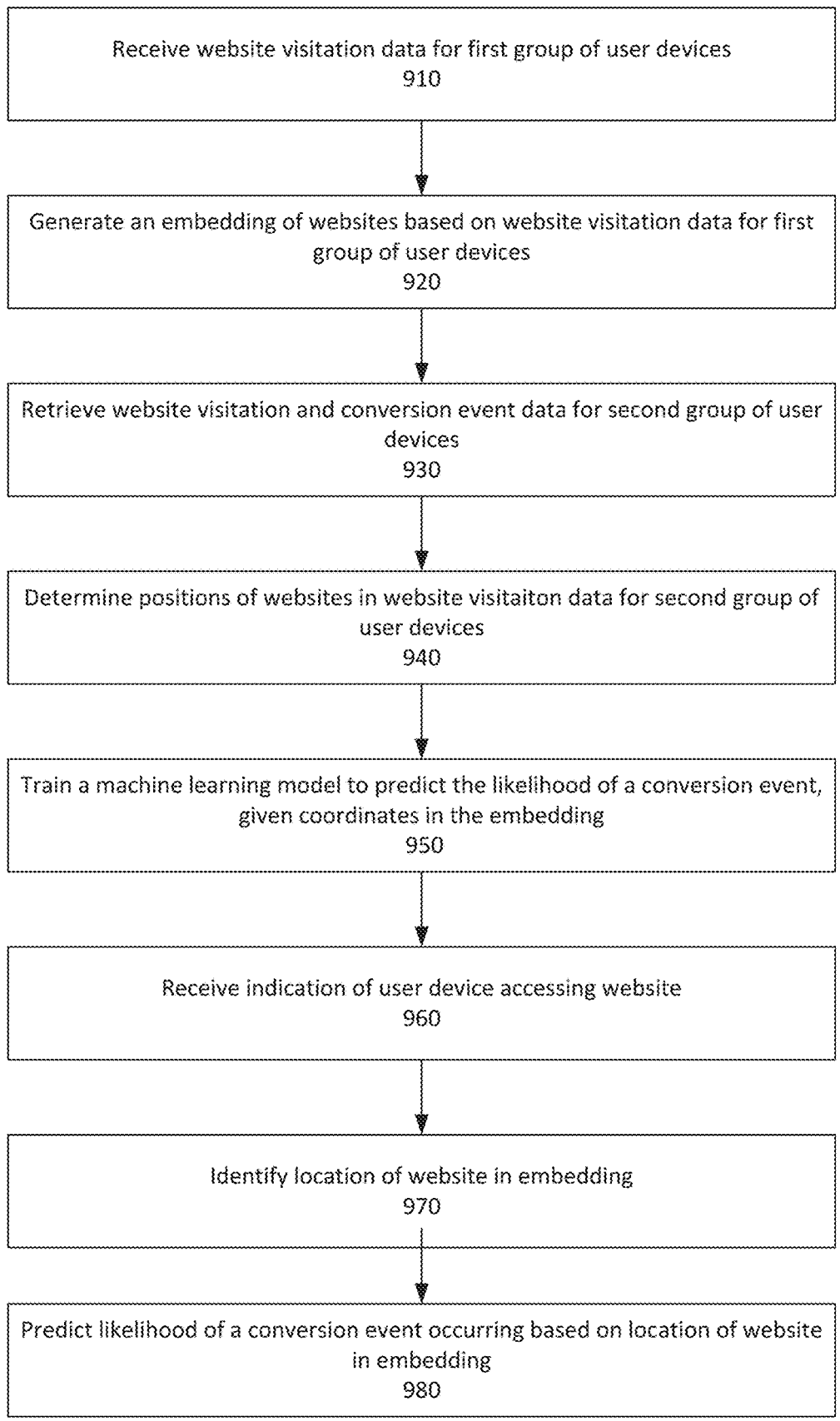
FIG. 9 is a flow chart of a method for generating a conversion likelihood, according to an embodiment.

FIG. 9 is a flow chart of a method for generating a conversion action likelihood, according to an embodiment. At 910, website visitation data for a first group of user devices can be received and/or accessed. As discussed above, in some instances the first group of users can be users who have opted in or been compensated to have their activity monitored. In other instances, the first group of users can be drawn from a tracking system based on cookie identifiers or another suitable identifier, or the website visitation data can be a set of events generated by the same user, but with no associated identifier.

At 920, the website visitation data for the first group of user devices can be used to generate a 128-dimensional embedding of websites in a manner similar to that described above with reference to FIGS. 7 and 8, particularly events 410, 420, and 430.

At 930, data, including website visitation data and/or conversion event data can be accessed and/or received. In some embodiments targeted content such as advertisements can be displayed on selected websites. Click-through or other measurements of conversion from targeted content on those websites can be used to indicate a conversion likelihood for that website and/or websites nearby in the 128-dimensional embedding (e.g., within a predetermined distance). For example, a variety of targeted content can be displayed on select websites, such that a measure of effectiveness of different types of targeted content can be made for each selected website and/or regions of the 128-dimensional embedding. Such a technique can allow for the effectiveness of multiple types of targeted content as a function of position in the 128-dimensional embedding to be measured. Such embodiments are particularly well suited to instances in which the conversion event data received at 930 includes little or no data tied to user identifiers, such as environments in which cookie data is unavailable and/or unreliable for a significant portion users represented in the conversion event data. The conversion event data receive at 930 can include information about the device, information identifying when a website (e.g., containing an item of targeted content) was accessed/displayed and/or historical website visitation events. The conversion event information can also include device location, time of day, operating system, device type, etc.

In other embodiments, conversion data event data may not be directly associated with targeted content. For example, accessing a website associated with a brand can constitute a conversion event. Referral or other analytic data can reveal how a user reached the website associated with the brand and/or what other websites have been accessed by that user. Websites that refer traffic to the website associated with the brand or otherwise appear in browsing history of users that access the website associated with the brand can have high conversion rates. Conversely websites that under index (e.g., relative to random internet traffic) in referral or browsing history data of users that access the website associated with the brand can have low conversion rates.

In addition or alternatively, historical website visitation data and/or conversion data (e.g., cookie or other user-tracking data) associated with a second group of user devices can be accessed and/or received at 930. The second group of user devices can be the same as, partially overlap with, or be mutually exclusive from the first group of user devices. The conversion event data can indicate that a subset of the second group of user devices engaged in a conversion action such as, for example, purchasing a good or service, clicking an advertisement, visiting a particular website (e.g., associated with a brand or topic) or other target outcome, visiting a physical retail location, etc.

Using the conversion event data and/or the website visitation records retrieved at 930, a machine learning model can be trained to select appropriate content and/or predict the likelihood of a conversion event for a particular item of targeted content, given coordinates in the 128-dimensional embedding, at 950. In embodiments in which targeted content is displayed on selected websites, the reaction to such targeted content (e.g., click-through rate). and the location of the selected websites in the 128-dimensional embedding can be used to train a machine learning model to identify websites likely to produce high conversion rates for a particular item of targeted content, predict a likelihood of a conversion event for an item of targeted content displayed on a particular website, and/or to optimize the website selected to display content and/or type of content served. ("Optimize" as used herein does not necessarily refer to identifying an objective optimal solution, but instead to the minimization of a loss function or other suitable technique to arrive at at least a local maximum or minimum representing, for example, conversion likelihood.) In instances in which website visitation data for a second group of user devices is available, the position in the 128-dimensional space of user devices in the second group of user devices and/or websites indicated in the user device's website visitation records can be used train the machine learning model to predict likelihood of a conversion event. Similarly stated, the coordinates in the 128-dimensional space of websites visited and/or user devices associated with conversion actions can tend to indicate that that portion of the embedding is associated with conversions, while the coordinates in the 128-dimensional space of websites visited and/or user devices that are not associated with conversion actions to particular types of targeted content can be negatively correlated with conversions. Thus, the trained model can be operable to identify suitable content and/or return a likelihood of a conversion event occurring, given a set of coordinates in the 128-dimensional space. In instances in which additional conversion event data, such as information identifying when a website (e.g., containing an item of targeted content) was accessed/displayed, historical website visitation events, device location, time of day, operating system, device type, etc., such information can also be used to train the machine learning model and such factors can be used by the machine learning model to predict conversion likelihood.

In some embodiments, the machine learning model can incorporate cost information and be trained, for example, to estimate an expected price per conversion event, given a set of coordinates in 128-dimensional space, and/or the selection of suitable content over cost of delivering targeted content to a website. For example, the machine learning model can be trained using a dataset (that may not be associated with any specific users or user identifiers) that can be the output of a model that returns auction win rate as a function of bid price for each website, the data set can include direct historical data on the cost of delivering targeted content to each website, and/or the dataset can be of any other suitable form.

At 960, an indication that a user device is accessing a website is received. The user device may not be from the first group of user devices, the second group of user devices, and/or be a device for which historic website visitation is available. In some instances the user device can be "untrackable." For example, the device may have deleted or disabled cookies, may present a generic or spoofed user agent, may access the website via a virtual private network, and/or otherwise have taken steps to obfuscate its web browsing history. Using known methods, significant challenges exist selecting targeted content for untrackable devices. Additionally, the website may not have appeared in the conversion event data. Thus, there may not be any direct data linking conversion event data to the website.

At 970, a position of the website accessed by the user device in the 128-dimensional space can be identified. The position of the website in the 128-dimensional space can be identified based on a small subset of the first group of user devices that was observed visiting the website and/or a relatively small amount of data, which may not include brand or purchase-related data.) This position can in turn be used as a privacy-sensitive proxy to select appropriate targeted content to be served with the website. Similarly stated, the position of the website can be provided to the trained model, which can identify appropriate targeted content to serve with the website and/or produce a value indicative of a likelihood of a conversion event occurring (e.g., the likelihood of a purchase of a good and/or service), at 980. Targeted content can be delivered to the user device based on the output of the trained model, for example, embedded in the webpage accessed by the user device.

The machine learning model trained at 950 can be privacy-sensitive, such that an advertisement display opportunity is not required to include privacy-sensitive contents as input to the machine learning model. For example, the advertisement display opportunity triggered by the user device's access to the webpage at 960 may not include or be associable with website traffic data records of the user devices. Additionally, the machine learning model trained at 950 may not require, as an input, any information associated with the textual or non-textual contents of the webpage.

While various embodiments have been described above, it should be understood that they have been presented by way of example only, and not limitation. Furthermore, although various embodiments have been described as having particular features and/or combinations of components, other embodiments are possible having a combination of any features and/or components from any of embodiments where appropriate as well as additional features and/or components.

For example, although FIG. 1 depicts a single audience identification device 110 and a single targeted content provider 120, it should be understood that this is for ease of description and illustration only. In other embodiments, a system can include any number of audience identification device and/or targeted content providers. Moreover, it should be understood that computing entities, processors, and/or memories described herein can include distributed architectures. Furthermore, although shown as separate, in some embodiments, various computing entities can be physically and/or logically collocated. For example, the audience identification device 110 and the targeted content provider 120 can be a single logical and/or physical device.

As another example, although FIG. 9 is generally described in the context of selecting targeted content given a website and/or position in the 128-dimensional space, it should be understood that the machine learning model described above can be configured to identify websites and/or positions in the 128-dimensional space best suited (e.g., most likely to convert) a particular item of targeted content.

As yet another example, although some embodiments described generating a 128-dimensional embedding based on patterns of user interaction with websites, it should be understood that in other embodiments, a dataset of website keywords and topics may be available that may not be associated with any specific users or user devices. Such a database can include keywords, topics, or other numerical vector representations of keywords or topics, derived from the textual and/or graphical content of the webpage. A machine learning technique and/or neural network such as an autoencoder may be used to define an encoding layer, using data from the position of websites in the 128-dimensional embedding space and the keyword and/or topic data. The encoding layer is a reduced dimensional space capturing similarities between websites, similar to the 128-dimensional embedding space. Unlike the 128-dimensional embedding space, a website need not appear in the dataset from the first group of user devices in order to be identified in the encoding layer. The position of a website in the encoding layer may be determined based on its keyword and/or topic data, its position in the 128-dimensional embedding space, or both. Thus the encoding layer captures a vector representation of a website based on a combination of behavioral, textual, and/or graphical information about the websites, where not all modalities of need be present. In this way, websites can be represented in vector form even if not all modalities of data are present for that website, and if multiple modalities are present, a higher-fidelity or more precise representation of the website may be available. The machine learning model at 950 can then be trained using website positions in the encoding layer space.

In the case of the encoding layer described above, the position of a website in the encoding layer can be determined based on its keyword and/or topic data, its position in the 128-dimensional embedding space, or both. A position can also be determined for a set of keywords and/or topic data alone. A proximity or distance can be measured between any two positions in the encoding layer using any suitable distance metric, (e.g., cosine distance, Euclidean distance, etc.) The positions of the websites, keywords, and/or topics can then be used directly to select websites for targeted content delivery. In one embodiment, a website with a position in the space can be selected as a target, other websites in the encoding layer can be ranked based on their proximity to the target website in the encoding layer. The target website could be, for example, associated with a desired brand outcome (e.g., a webpage associated with the brand) or another website (e.g., a product review blog). In another embodiment, a set of keywords and/or topics can be used as a target, and websites in the encoding layer can be ranked based on their proximity to the target keywords and/or topics in the encoding layer. Additionally, the encoding space can be used to automatically generate appropriate names and/or descriptive keywords for clusters of websites. The position of each of a large corpus of words and phrases, for example from Wikipedia, can be identified in the encoding layer. Then, given a set of websites with location in the encoding layer, a ranked list of relevant keywords and/or topics can be generated based a suitable distance metric, for example distance from the centroid of the website positions. U.S. patent application Ser. No. 16/937,223 entitled "Machine Learning System and Method to Map Keywords and Records into an Embedding Space," the entire disclosure of which is hereby incorporated by reference includes additional description of generating embeddings and ascertaining similarities between items represented in the embedding. U.S. patent application Ser. No. 16/937,223 further describes defining a descriptive title for an audience. It should be understood that the encoding layer described above could be used to define such a descriptive title, for example, in instances in which behavioral data for an audience and/or audience members is available and/or received. Such behavioral data can be used to identify a location in the encoding space for the audience and/or audience members. A descriptive title for the audience can then be defined based, for example, on the position(s) of keywords and/or topic(s) in the encoding space.

Some embodiments described herein relate to methods. It should be understood that such methods may be computer-implemented methods (e.g., instructions stored in memory and executed on processors). Where methods described above indicate certain events occurring in certain order, the ordering of certain events may be modified. Additionally, certain of the events may be performed repeatedly, concurrently in a parallel process when possible, as well as performed sequentially as described above. Furthermore, certain embodiments may omit one or more described events.

Some embodiments described herein relate to computer-readable medium. A computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as ASICs, PLDs, ROM and RAM devices. Other embodiments described herein relate to a computer program product, which can include, for example, the instructions and/or computer code discussed herein.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using Java, C++, or other programming languages (e.g., object-oriented programming languages) and development tools. Additional examples of computer code include, but are not limited to, control signals, encrypted code, and compressed code.

What is claimed is:

1. A non-transitory processor-readable medium storing code configured to be executed by a processor, the code including instructions configured to cause the processor to:
receive web browsing history data for a plurality of users that has not opted out of having conversion event data tracked, the web browsing history data including an indication that at least one user from the plurality of users performed a conversion action;
define an encoding layer representing a plurality of websites, the encoding layer being a reduced dimensional space capturing similarities between websites from the plurality of websites;
train a machine learning model using the web browsing history data to predict, for each position in the encoding layer, a likelihood of conversion;
receive an indication that a user device has accessed a website from the plurality of websites, the user device not reporting cookie information and not known to be associated with any user from the plurality of users;
determine a position in the encoding layer of the website accessed by the user device; and
predict, after the machine learning model is trained, a likelihood the user device performing a conversion action using the machine learning model based on the position of the website in the encoding layer and no data derived from user identifiers associated with the user device; and
facilitate delivery of targeted content to the user device based on the likelihood of the user device performing the conversion action.

2. The non-transitory processor-readable medium of claim 1, wherein the website from the plurality of websites does not appear in the web browsing history data.

3. The non-transitory processor-readable medium of claim 1, wherein the web browsing history data includes cookie data.

4. The non-transitory processor-readable medium of claim 1, wherein the web browsing history data indicates that a subset of users from the plurality of users visited the website.

5. The non-transitory processor-readable medium of claim 1, wherein the web browsing history data indicates that at least a subset of users from the plurality of users were exposed to an item of targeted content at the website.

6. The non-transitory processor-readable medium of claim 1, wherein:
the web browsing history data indicates that a subset of users from the plurality of users visited the website; and
the web browsing history data indicates that at least one user from the subset of users was exposed to an item of targeted content at the website.

7. The non-transitory processor-readable medium of claim 1, wherein the web browsing history data indicates that at least a subset of users from the plurality of users were exposed to an item of targeted content.

8. The non-transitory processor-readable medium of claim 1, wherein:
the web browsing history data indicates that at least a subset of users from the plurality of users were exposed to an item of targeted content; and
the web browsing history data indicates that at least one user from the subset of users visited the website.

9. The non-transitory processor-readable medium of claim 1, wherein the web browsing history data includes aggregate conversion event data.

10. The non-transitory processor-readable medium of claim 1, wherein:
the machine learning model is trained to predict the likelihood of conversion based, at least in part, on an item of targeted content; and the instructions to facilitate the delivery of targeted content to the user include instructions to select an item of targeted content based on the position of the website in the encoding layer.

11. The non-transitory processor-readable medium of claim 1, wherein:
the machine learning model is trained to optimize a selection of targeted content given a position in the embedding; and
the instructions to facilitate the delivery of targeted content to the user device include instructions to select an item of targeted content based on the position of the website in the encoding layer.

12. The non-transitory processor-readable medium of claim 1, wherein the web browsing history data includes an indication that:
a first user from the plurality of users visited a first website and was exposed to a first item of targeted content; and
a second user from the plurality of users visited the first website and was exposed to a second item of targeted content.

13. The non-transitory processor-readable medium of claim 1, wherein the web browsing history data includes an indication that:
a first user from the plurality of users visited a first website and was exposed to a first item of targeted content; and
a second user from the plurality of users visited a second website and was exposed to the first item of targeted content.

14. The non-transitory processor-readable medium of claim 1, wherein the web browsing history data is first web browsing history data for a first plurality of users, the code further comprising code to cause the processor to:
receive second web browsing history data for a second plurality of users, the second plurality of users at least partially different from the first plurality of users; and
define the encoding layer based on the second web browsing history data.

15. The non-transitory processor-readable medium of claim 1, the code further comprising code to cause the processor to:
identify a plurality of clusters of websites in the encoding layer, each cluster of websites from the plurality of clusters of websites associated with a different region from a plurality of regions in the encoding layer; and
select the targeted content based on the website being a member of a cluster of websites from the plurality of clusters of websites.

16. The non-transitory processor-readable medium of claim 1, wherein historic website visitation data is not available for the user device.

17. The non-transitory processor-readable medium of claim 1, further comprising:
accessing an embedding representing the plurality of websites, the encoding layer defined based on the embedding.

18. The non-transitory processor-readable medium of claim 17, wherein:
the encoding layer is used to automatically generate appropriate names and/or descriptive keywords for identifying a plurality of clusters of websites;
the machine learning model is trained to predict the likelihood of the user device performing the conversion action based on the website being a member of a cluster of websites from the plurality of clusters of websites.

19. The non-transitory processor-readable medium of claim 17, wherein the machine learning model further incorporates cost information and is trained to estimate an expected price per conversion action.

20. A computer implemented method, comprising:
receiving an indication that a user device that does not report cookie information is accessing a website;
defining an encoding layer that represents a plurality of websites including the website based on web browsing history data from a plurality of user devices that has not opted out of having website browsing history tracked, the user device not being included in the plurality of user devices, the encoding layer being a reduced dimensional space capturing similarities between websites from the plurality of websites;
executing a trained machine learning model to select an item of targeted content to present to the user device based on a position of the website in the encoding layer and no data derived from user identifiers associated with the user device, the trained machine learning model trained on conversion event data that includes web browsing history of a second plurality of user devices and indicates that at least a subset of the second plurality of user devices performed a conversion action, the user device not being included in the second plurality of user devices; and
facilitating delivery of the item of targeted content to the user device.

21. The computer implemented method of claim 20, further comprising:
training a machine learning model to produce the trained machine learning model, the machine learning model trained with the conversion event data to predict a likelihood of conversion for each location in the encoding layer based on the conversion event data.

* * * * *